(12) United States Patent
Valentine

(10) Patent No.: US 9,048,648 B1
(45) Date of Patent: Jun. 2, 2015

(54) COVER PLATE SCREW EXTENDER

(71) Applicant: Jim Valentine, Dallas, TX (US)

(72) Inventor: Jim Valentine, Dallas, TX (US)

(*) Notice: Subject to any disclaimer, the term of this patent is extended or adjusted under 35 U.S.C. 154(b) by 0 days.

(21) Appl. No.: 14/297,823

(22) Filed: Jun. 6, 2014

Related U.S. Application Data

(60) Provisional application No. 61/895,280, filed on Oct. 24, 2013, provisional application No. 61/949,718, filed on Mar. 7, 2014.

(51) Int. Cl.
*H02G 3/14* (2006.01)

(52) U.S. Cl.
CPC ...................... *H02G 3/14* (2013.01)

(58) Field of Classification Search
USPC ...................................... 174/50, 54
See application file for complete search history.

(56) References Cited

U.S. PATENT DOCUMENTS

| | | |
|---|---|---|
| 793,399 A | 6/1905 | Schultz |
| 867,624 A | 10/1907 | Warthen |
| 937,577 A | 10/1909 | Crump |
| 1,078,007 A | 11/1913 | Stange |
| 1,988,813 A | 1/1935 | Seguin |
| 2,485,280 A | 10/1949 | Grace |
| 3,563,131 A | 2/1971 | Ridley, Sr. |
| 4,111,568 A | 9/1978 | Wing |
| 4,635,337 A | 1/1987 | Helderman |
| 4,784,554 A | 11/1988 | Break |
| 5,030,052 A | 7/1991 | Anderson et al. |
| 5,860,548 A | 1/1999 | Kerr, Jr. |
| 5,907,124 A | 5/1999 | Reiker |
| 5,965,845 A | 10/1999 | Reiker |
| 6,096,974 A | 8/2000 | Reiker |
| 6,204,450 B1 | 3/2001 | Reiker |
| 6,207,898 B1 | 3/2001 | Reiker |
| 6,207,989 B1 | 3/2001 | Li et al. |
| 6,291,768 B1 | 9/2001 | Reiker |
| 6,303,859 B1 | 10/2001 | Reiker |
| 6,423,899 B1 | 7/2002 | Reiker |
| 6,811,364 B2 | 11/2004 | Kelzer |
| 6,910,826 B1 | 6/2005 | Damiano |
| 7,105,742 B1 * | 9/2006 | Jolly ................................. 174/50 |
| 7,985,041 B2 | 7/2011 | Lin |
| 8,109,785 B2 | 2/2012 | Kidman |
| 2002/0197132 A1 | 12/2002 | Cruz et al. |
| 2004/0057811 A1 | 3/2004 | Kelzer |
| 2006/0036259 A1 | 2/2006 | Carl et al. |
| 2010/0086378 A1 | 4/2010 | Lin |
| 2013/0215381 A1 | 8/2013 | Raghuprasad |
| 2014/0102745 A1 * | 4/2014 | Gomez ........................... 174/50 |

\* cited by examiner

*Primary Examiner* — Dhirubhai R Patel

(74) *Attorney, Agent, or Firm* — Jack D. Stone, Jr., Esq.; Scheef & Stone, L.L.P.

(57) ABSTRACT

An apparatus for facilitating using a screw to secure a receptacle cover plate over a junction box recessed in a wall, the junction box including at least one tapped screw receiver, and the cover plate defining at least one hole corresponding to the at least one tapped screw receiver. At least one stud threadingly engages the at least one tapped screw receiver, and at least one threaded bushing is threadingly secured to one end of the at least one stud. The at least one screw extends through the at least one hole defined in the cover plate to threadingly engage the threaded bushing, thereby securing the cover plate to the junction box.

11 Claims, 5 Drawing Sheets

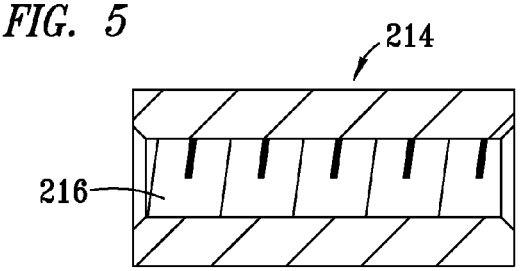
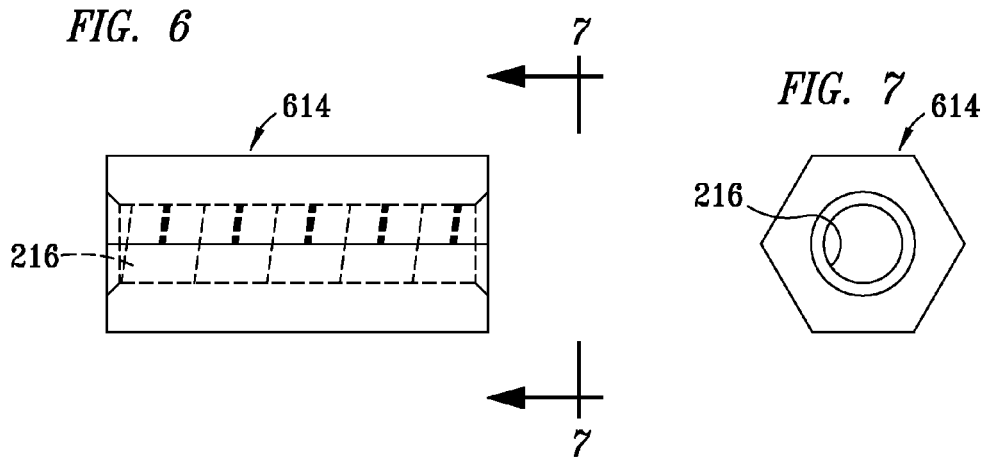
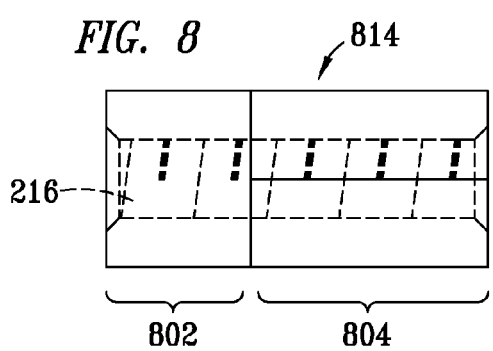
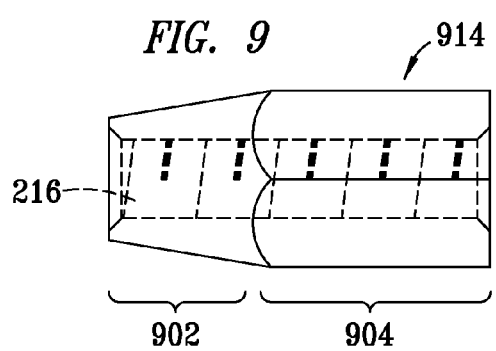

COVER PLATE SCREW EXTENDER

CROSS-REFERENCE TO RELATED APPLICATIONS

This application claims the benefit of U.S. Provisional Application No. 61/895,280, filed Oct. 24, 2013, and U.S. Provisional Application No. 61/949,718, filed Mar. 7, 2014, both of which applications are hereby incorporated herein by reference, in their entirety.

TECHNICAL FIELD

The invention relates generally to junction boxes and, more particularly, to a method and an apparatus for attaching a cover plate to a recessed junction box.

BACKGROUND

With reference to FIG. 1, showing the prior art, a junction box (including electric boxes) assembly 100 includes a junction box 102 positioned within the wall 105 so that it is generally flush with the outside of the wall 105. The box 102 is exemplified with two tapped screw receivers 104, though it could be configured with one or more than two tapped screw receivers. A cover plate 108 is positioned over the junction box 102 such that holes 106 defined in the plate 108 correspond with and are aligned with the tapped screw receivers 104 on the junction box. Screws 110 are then inserted through the holes 106 of the cover plate 108 and into the tapped screw receivers 104 of the junction box 102 to thereby secure the cover plate 108 to the junction box. While the cover plate 108 is shown as a blank, it may be configured in any of a number of different ways suitable for serving the function intended for the junction box 102, such as an electric junction box, switchbox, coax cable box, audio box, telephone jack box, or the like.

While a cover plate 108 may be readily secured to a junction box 102 in a situation such as depicted in FIG. 1 wherein the junction box is generally flush with the outside of the wall 105, it is common for the wall 105 to be subsequently resurfaced with ceramic tile, granite, or the like that is thicker than the original tile or granite, or for ceramic tile, granite, or the like to be laid on top of the existing wall, or for ceiling fans to be installed with extended housings, all of which result in the junction box being recessed into the wall, perhaps as much as two inches into the wall. In such cases, the function box 102 then becomes recessed within the wall 105 instead of flush with the outside of the wall. When that occurs, the screws 110 that are included with the cover plate are typically not long enough to extend through the holes 106 into the tapped screw receivers 104 to thereby secure the cover plate 108 to the junction box 102. One solution to such a dilemma is to use longer screws that will extend the additional length needed to engage the threaded holes 104 from the cover plate. There are two problems with that, though. First, longer screws are typically not readily available without visiting a hardware store. Second, if such screws are obtained, then, because of the additional distance that the screw has to travel, it is difficult to align the screw 110 with the tapped screw receivers 104.

Therefore, what is needed is a method and apparatus for enabling cover plates to be readily secured to recessed junction boxes.

SUMMARY

The present invention, accordingly, provides an apparatus for facilitating using at least one screw to secure a receptacle cover plate to a junction box recessed in a wall, wherein the junction box includes at least one tapped screw receiver, and the cover plate defines at least one hole corresponding to the at least one tapped screw receiver. The apparatus includes at least one stud configured for engaging the at least one tapped screw receiver, and at least one threaded bushing secured to one end of the at least one stud. The at least one threaded bushing is configured for receiving the at least one screw extending through the at least one hole defined in the cover plate for securing the cover plate to the junction box.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a cross-section of the bushing of FIGS. 2-4;

FIG. 6 is a side view of an alternative embodiment of the bushing of FIGS. 2-5;

FIG. 7 is an end view of the bushing of FIG. 6 taken along view line 7-7;

FIG. 8 is a side view of an alternative embodiment of the bushings of FIGS. 2-7;

FIG. 9 is a side view of an alternative embodiment of the bushings of FIGS. 2-8;

DETAILED DESCRIPTION

Figure 1:
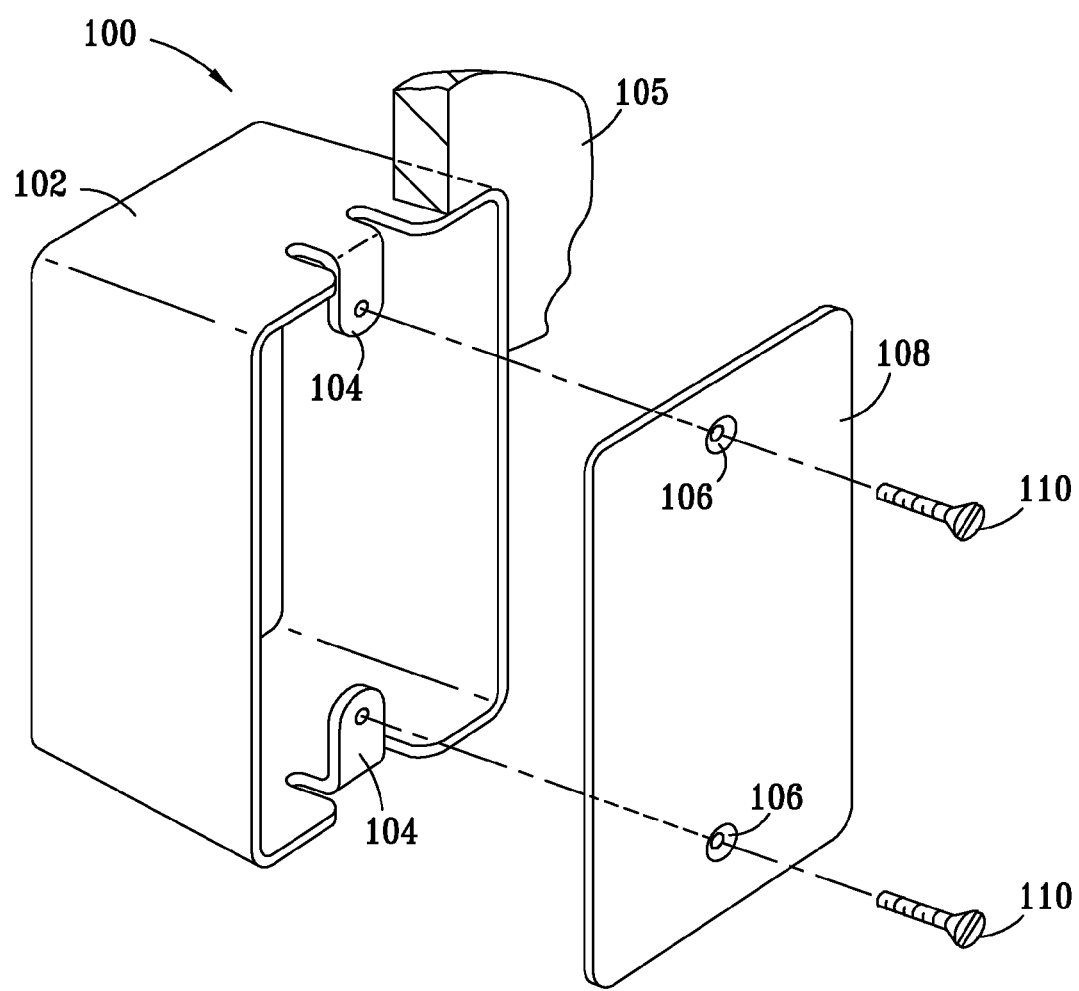
FIG. 1 is a perspective view of a junction box and cover plate embodying features of the prior art.

In the following discussion of the figures, the same reference numerals will be used throughout to refer to the same or similar components. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

Figure 2:
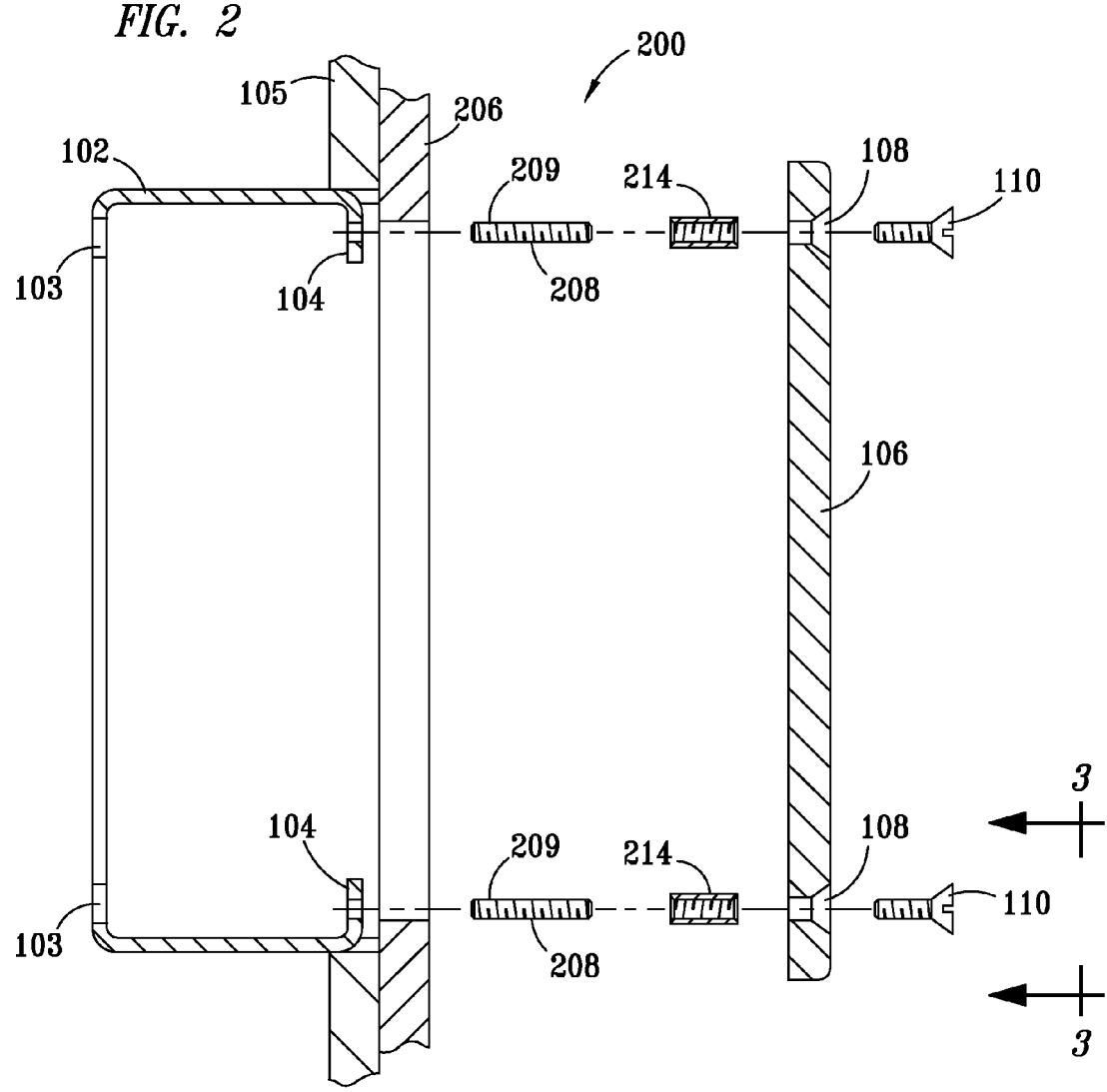
FIG. 2 is a partially exploded side view exemplifying a junction box recessed within a wall and a cover plate to be secured to the junction box in accordance with principles of the present invention.
Figure 4:
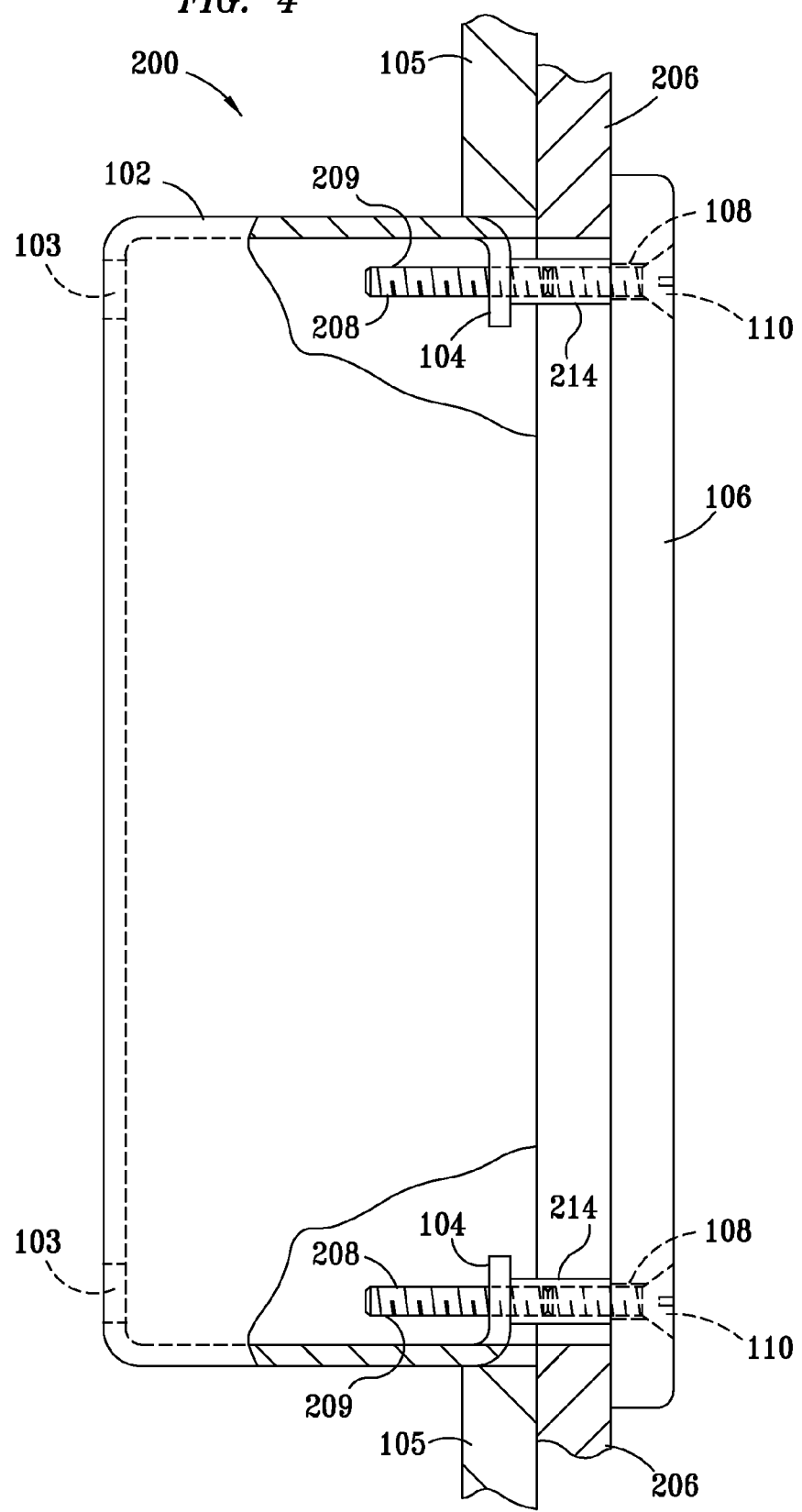
FIG. 4 exemplifies the cover plate of FIG. 2 secured to the junction box of FIG. 2 in accordance with principles of the present invention.
Figure 10:
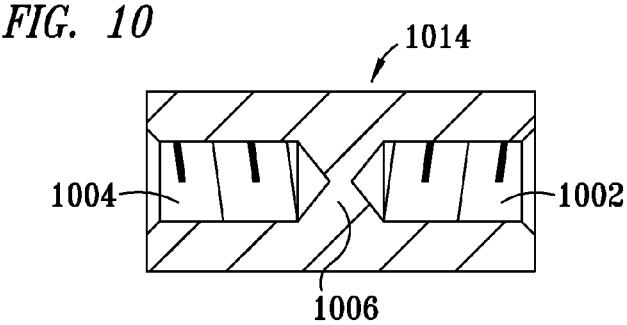
FIG. 10 is a cross-section of an alternate embodiment of the bushing of FIG. 5.
Figure 11:
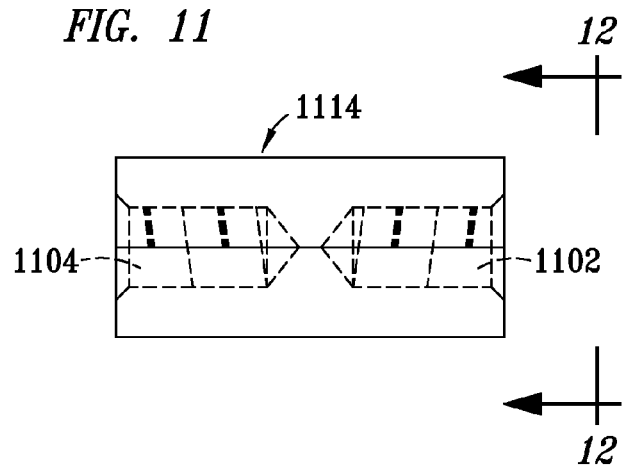
FIGS. 11 and 12 are respective side and end views of an alternative embodiment of the bushing of FIGS. 6 and 7.
Figure 12:
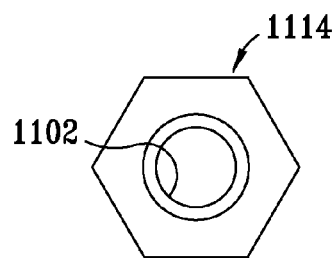
Figure 13:
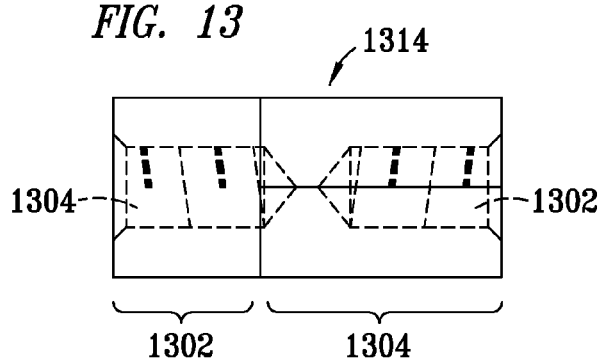
FIG. 13 is a side view of an alternative embodiment of the bushing of FIG. 8.
Figure 14:
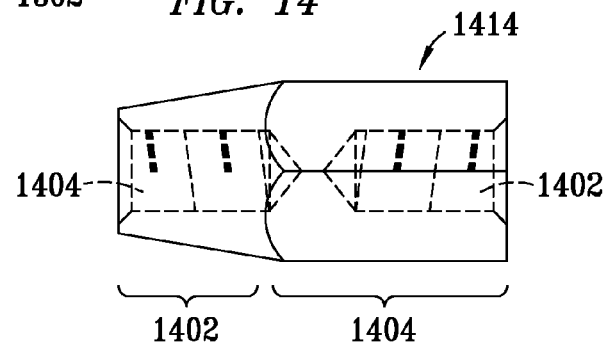
FIG. 14 is a side view of an alternative embodiment of the bushing of FIG. 9.

Referring to FIG. 2 of the drawings, the reference numeral 200 generally designates a junction box assembly embodying features of the present invention. The assembly 200 includes the junction box 102 secured to the wall 105. The junction box 102 further includes the tapped screw receivers 104 and, optionally, defines holes 103 aligned with the tapped screw receivers 104 for allowing long screws 110 to extend through. As shown in FIG. 2, the wall 105 has been overlaid with a layer of ceramic tile, granite, or the like 206. As a result, the screw 110 will not reach the tapped screw receivers 104 from the cover plate 106. However, in accordance with principles of the present invention, each tapped screw receiver 104 is provided with at least one threaded stud (aka, a headless screw or blind screw) 208 having, as shown more clearly in cross-section in FIG. 5, a threaded bushing 214 (having a length equal to or less than the thickness of the overlay 206) secured to one end of the stud 208, and each stud 208 is screwed into a respective tapped screw receiver 104. With each threaded bushing 214 secured to a respective stud 208, and each stud 208 secured to a respective tapped screw receiver 104, the cover plate 106 may be positioned over the junction box 102 and the screws 110 may be inserted through the holes 108 into respective threaded bushing 214 to thereby secure the cover 106 to the junction box 102, as depicted by FIG. 4.

In one preferred embodiment of the invention, the stud 208 is also provided with a light coat of lacquer 209, or the like, effective for creating friction or resistance to movement, so that when the threaded bushing 214 is screwed to the end of the stud 208, and the stud 208 is screwed into the tapped screw receiver 104, there will be resistance to the threaded bushing 214 unscrewing from the stud 208 or the stud 208 unscrewing from the tapped screw receiver 104, so that the screws 110 may be more securely screwed into respective threaded bushings 214, to thereby secure the cover plate 106 to the junction box 102.

In an alternate preferred embodiment of the invention, the threaded bushing 214 is permanently secured to the stud 208 by means of a bonding agent, such as epoxy, a tack weld, or the like.

Figure 3:
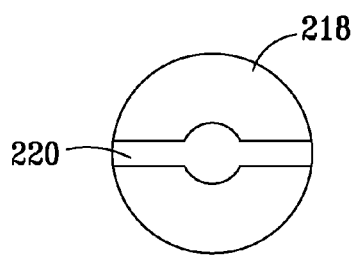
FIG. 3 exemplifies the head of the screw in one embodiment of the present invention.

As shown in FIG. 3, the head of the screw 110 is configured for being operative via a flathead screwdriver. While not shown, the head of the screw 110 could be configured for any of a number of different types of drivers, such as, by way of example, but not limitation, a Phillips head screwdriver.

FIG. 6 exemplifies a bushing 614 as an alternative embodiment of the bushing 214 of FIGS. 2-5. The bushing 614 is similar to the bushing 214, but for being configured with a hexagonal exterior, as shown in FIG. 7. The hexagonal exterior is adapted for being gripped by a tool such as a wrench or pliers for facilitating tightening or loosening of a stud 208 or screw 110.

FIG. 8 exemplifies a bushing 814 as an alternative embodiment of the bushing 214 of FIGS. 2-7. The bushing 814 is a hybrid of the bushings 214 and 614, wherein a portion 802 of the bushing defines a circular exterior similar to the bushing 214, and a portion 804 of the bushing defines a hexagonal exterior similar to the bushing 614.

FIG. 9 exemplifies a bushing 914 as an alternative embodiment of the bushing 814 of FIG. 8. The bushing 914 is similar to the bushing 814, having a portion 904 similar to the portion 804 of FIG. 8. The bushing 914 further includes a portion 902 which, unlike the portion 802 of the bushing 814, defines a conical section.

FIGS. 10-14 exemplify bushings 1014, 1114, 1314, and 1414 corresponding respectively to bushings 214, 614, 814, and 914 of FIGS. 5-9, but for each of bushings 1014, 1114, 1314, and 1414 further defining a stop (e.g., 1006, FIG. 10) proximate to the center between opposing threaded portions 1002 and 1004 of bushing 1014, between threaded portions 1102 and 1104 of bushing 1114, between threaded portions 1302 and 1304 of bushing 1314, and between threaded portions 1402 and 1404 of bushing 1414, to control how far a stud 208 or screw 110 in the threaded portions may be tightened against the bushing. Compared to the bushings 214, 614, 814, and 914, the bushing 1014, 1114, 1314, and 1414 facilitate greater tightening of a stud or screw without concern that the stud or screw may push the opposing screw or stud out of the bushing.

Particular dimensions of various components of the invention have not been discussed as they would be understood and/or could be determined by a person having ordinary skill the art. However, it is noted that, for manufacturing purposes, it may be desirable to include studs 208 in two or more lengths so that a user may select a size that is most suitable for his purposes. Alternatively, studs 208 could be provided in a single length constituting the longest length that it is anticipated that a user would need, and then cut to a desirable length. However, special skill would be required to cut a stud without damaging the threads.

In operation, a threaded bushing 214, 614, 814, 914, 1014, 1114, 1314, or 1414 is secured to one end of the each stud 208. A stud and bushing combination is screwed into each tapped screw receiver 104 of the junction box 102. A cover plate 108 is positioned over the junction box, and at least one screw is extended through each hole in the cover plate until it threadingly engages the threaded bushing, thereby securing the cover plate to the junction box.

It is understood that the present invention may take many forms and embodiments. Accordingly, several variations may be made in the foregoing without departing from the spirit or the scope of the invention. For example, the invention could be used in any of a number of different situations where a tapped screw receiver 104 is recessed.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for facilitating using at least one screw to secure a receptacle cover plate to a junction box recessed in a wall, the junction box including at least one threaded tapped screw receiver, the cover plate defining at least one hole corresponding to the at least one threaded tapped screw receiver, the apparatus comprising:

at least one stud threadingly configured to engage the at least one threaded tapped screw receiver;

at least one bushing defining first and second opposed threaded portions, the first threaded portion being configured to receive one end of the at least one stud, the second threaded portion being configured to receive the at least one screw extending through the at least one hole defined in the cover plate for securing the cover plate to the junction box; and a stop defined in an interior portion of the at least one bushing between the first and second opposing threaded portions, the stop being configured to control how far the at least one stud and the at least one screw may be tightened against the bushing without concern that the at least one stud or the at least one screw may push or loosen an opposing respective at least one screw or at least one stud in the bushing.

2. The apparatus of claim 1 wherein an exterior portion of the bushing defines a hexagonal surface.

3. The apparatus of claim 1 wherein an exterior portion of the bushing defines a conical surface.

4. The apparatus of claim 1 wherein at least a portion of the threads of the at least one stud are coated with lacquer.

5. The apparatus of claim 1 wherein:
   a first exterior portion of the bushing defines a hexagonal surface; and
   a second exterior portion of the bushing defines a conical surface.

6. A method for securing a receptacle cover plate to a junction box recessed in a wall, the junction box including at least one threaded tapped screw receiver, the cover plate defining at least one hole corresponding to the at least one threaded tapped screw receiver, the method comprising steps of:
   securing a first end of at least one stud into a first threaded portion of at least one bushing defining a first threaded portion and a second threaded portion opposing the first threaded portion, the at least one bushing further defining a stop in an interior portion of the at least one bushing between the first and second opposed threaded portions, the stop being configured to control how far at least one stud and at least one screw may be tightened against the bushing without concern that the at least one stud or the at least one screw may push or loosen an opposing respective at least one screw or at least one stud in the bushing;
   engaging a second end of the at least one stud into the at least one threaded tapped screw receiver of the junction box;
   positioning the cover plate over the junction box; and
   extending at least one screw through the at least one hole in the cover plate and threadingly engaging the second threaded portion of the at least one bushing, thereby securing the cover plate to the junction box.

7. The method of claim 6 wherein an exterior portion of the bushing defines a hexagonal surface.

8. The method of claim 6 wherein an exterior portion of the bushing defines a conical surface.

9. The method of claim 6 wherein:
   a first exterior portion of the bushing defines a hexagonal surface; and
   a second exterior portion of the bushing defines a conical surface.

10. The method of claim 6 further comprising a step of coating at least a portion of the threads of the at least one stud with lacquer.

11. The method of claim 6 further comprising a step of coating at least a portion of the threads of the at least one stud with lacquer, and wherein:
   the bushing defines a stop in an interior portion of the bushing between ends of the bushing;
   a first exterior portion of the bushing defines a hexagonal surface; and
   a second exterior portion of the bushing defines a conical surface.

* * * * *